United States Patent
Yeh

(10) Patent No.: US 7,015,401 B2
(45) Date of Patent: Mar. 21, 2006

(54) IMAGE PROCESSING SYSTEM WITH HANDWRITING INPUT FUNCTION AND THE METHOD FOR FORMING THE SAME

(75) Inventor: Chia-Jui Yeh, Taipei (TW)

(73) Assignee: Aiptek International, Inc., Hsin-Chu (TW)

(*) Notice: Subject to any disclaimer, the term of this patent is extended or adjusted under 35 U.S.C. 154(b) by 253 days.

(21) Appl. No.: 09/990,355

(22) Filed: Nov. 23, 2001

(65) Prior Publication Data
US 2003/0099408 A1 May 29, 2003

(51) Int. Cl.
*G08G 21/00* (2006.01)
*G09G 5/00* (2006.01)

(52) U.S. Cl. .................... 178/18.07; 345/173
(58) Field of Classification Search ............. 345/1.1, 345/173–175, 157; 178/18.01–18.09, 17; 395/200.2, 125; 343/767; 348/220, 230; 358/1.6; 356/375; 382/141, 173, 8; 396/56, 396/82; 455/550
See application file for complete search history.

(56) References Cited

U.S. PATENT DOCUMENTS

| | | | |
|---|---|---|---|
| 4,144,405 A * | 3/1979 | Wakamatsu | 178/30 |
| 4,672,683 A * | 6/1987 | Matsueda | 382/305 |
| 4,870,500 A * | 9/1989 | Nagashima | 358/443 |
| 5,253,647 A * | 10/1993 | Takahashi et al. | 600/424 |
| 5,257,093 A * | 10/1993 | Mager et al. | 356/625 |
| 5,345,514 A * | 9/1994 | Mahdavieh et al. | 382/152 |
| 5,495,576 A * | 2/1996 | Ritchey | 345/420 |
| 5,525,764 A * | 6/1996 | Junkins et al. | 178/18.01 |
| 5,680,636 A * | 10/1997 | Levine et al. | 715/512 |
| 5,710,588 A * | 1/1998 | Malhotra | 347/153 |
| 5,729,251 A * | 3/1998 | Nakashima | 709/250 |
| 5,748,183 A * | 5/1998 | Yoshimura et al. | 345/173 |
| 5,970,166 A * | 10/1999 | Nichani | 382/141 |
| 6,094,504 A * | 7/2000 | Wu et al. | 382/173 |
| 6,115,552 A * | 9/2000 | Kaneda | 396/82 |
| 6,297,870 B1 * | 10/2001 | Nanba | 355/18 |
| 6,445,461 B1 * | 9/2002 | Ozawa et al. | 358/1.6 |
| 6,512,541 B1 * | 1/2003 | Dunton et al. | 348/230.1 |
| 6,556,242 B1 * | 4/2003 | Dunton et al. | 348/220.1 |
| 6,567,078 B1 * | 5/2003 | Ogawa | 345/179 |
| 6,628,899 B1 * | 9/2003 | Kito | 396/56 |
| 6,653,983 B1 * | 11/2003 | Masuda et al. | 343/767 |
| 6,674,424 B1 * | 1/2004 | Fujioka | 345/157 |
| 6,690,492 B1 * | 2/2004 | Nakajima | 358/462 |
| 6,882,355 B1 * | 4/2005 | Kobayashi | 347/111 |
| 2002/0009216 A1 * | 1/2002 | Ogino | 382/131 |
| 2003/0003879 A1 * | 1/2003 | Saiki et al. | 455/90 |

* cited by examiner

*Primary Examiner*—Vijay Shankar
*Assistant Examiner*—Prabodh Dharia
(74) *Attorney, Agent, or Firm*—Rosenberg, Klein & Lee

(57) ABSTRACT

A digital system for mixing handwriting with an image is provided. The handwriting data is transmitted into the microprocessor of the image processing system, and then the microprocessor marks handwriting with a specific color and superimposes it on the image according to the coordinates and the degree of width of the handwriting, so as to form a new mixed image.

31 Claims, 10 Drawing Sheets

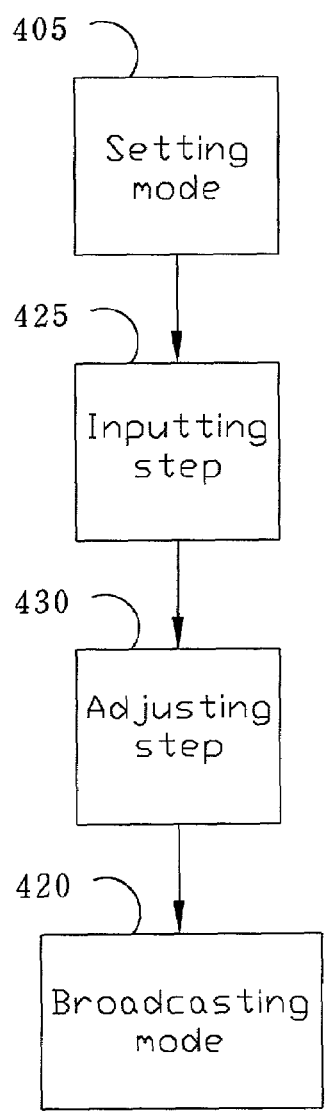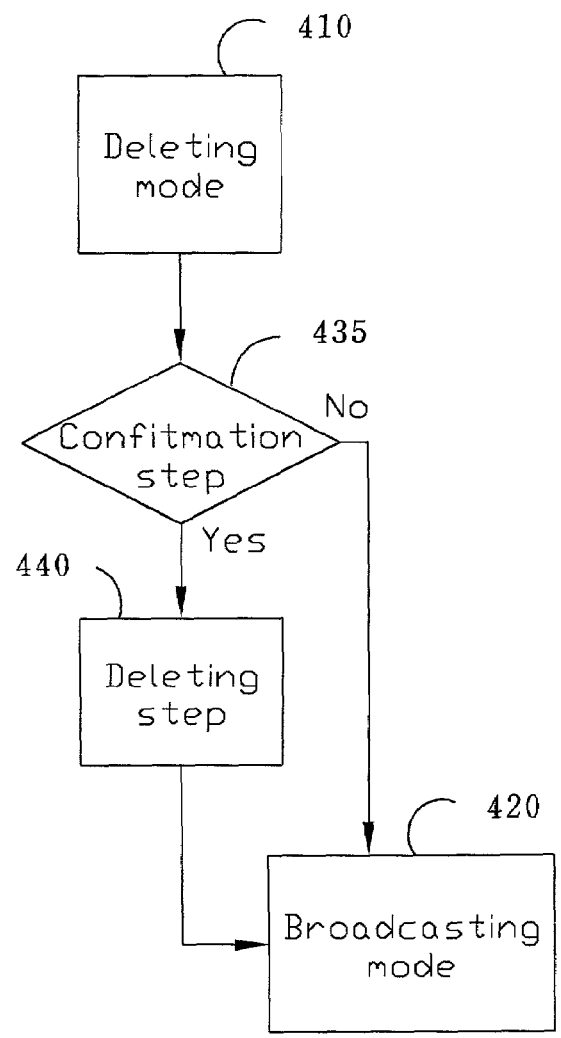
FIG.4B                    FIG.4C

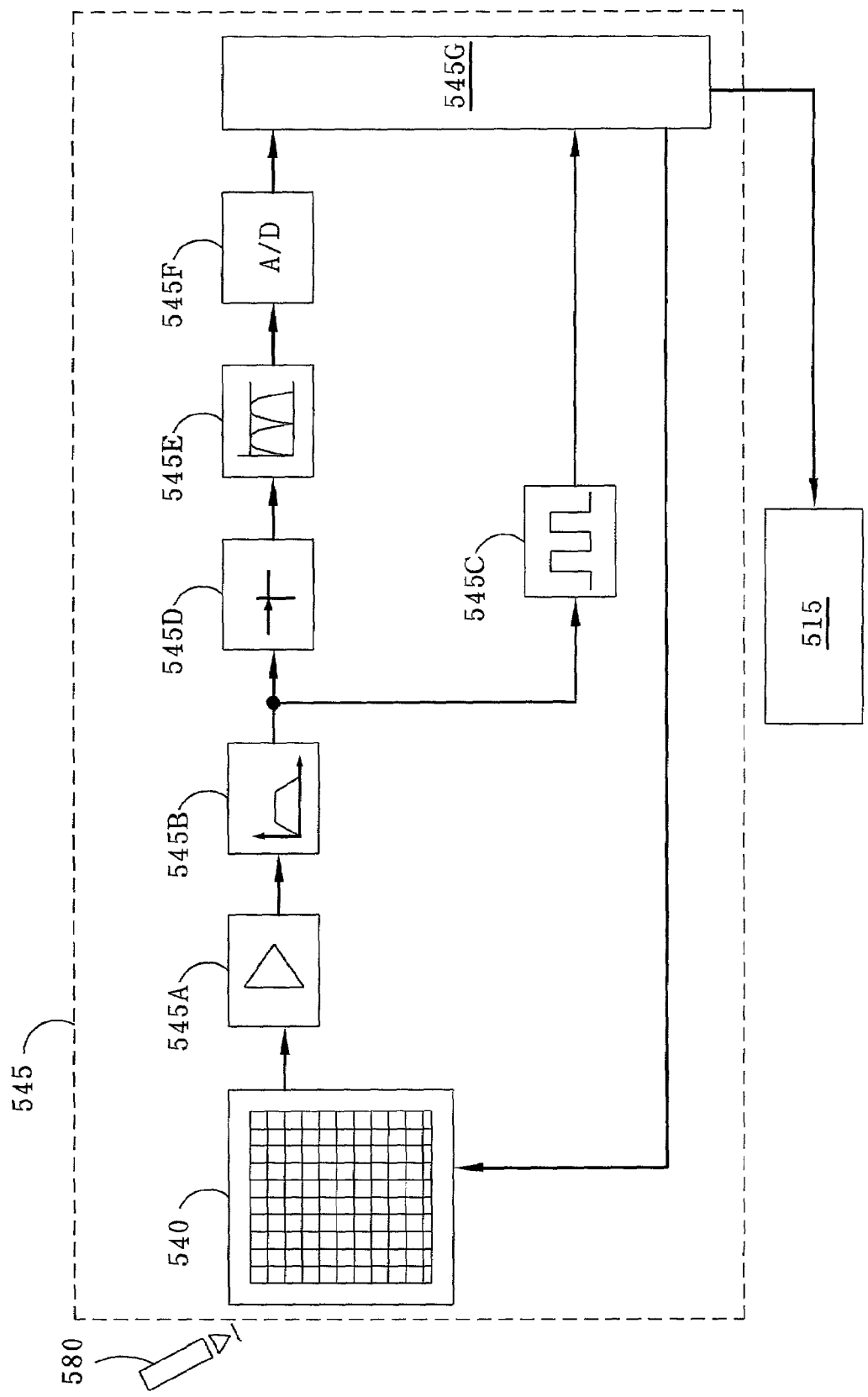

IMAGE PROCESSING SYSTEM WITH HANDWRITING INPUT FUNCTION AND THE METHOD FOR FORMING THE SAME

BACKGROUND OF THE INVENTION

1. Field of the Invention

The present invention relates generally to an image processing system, and more particularly to an image processing system with handwriting input function and the method for forming the same.

2. Description of the Prior Art

Because the handwriting recognition system could replace the mouse, and is more suitable than the mouse to allow the user to input words and patterns by user's hands, improvement of the handwriting recognition system is a hot and important field of current computer technology. The original idea of the handwriting recognition system is to replace the mouse. As usual, to enhance the user's convenience, handwriting recognition system usually replaces the mouse by both wireless pen and tablet. Herein, the pen nib of wireless pen usually corresponds to the left button of the mouse. Conventional handwriting recognition systems have been developed for many years, but these products are applied to perform only one function, such as drawing or inputting words.

Usually, handwriting recognition systems are a device with cordless pressure-sensitivity and electromagnetic-induction. Conventional cordless pressure-sensitivity and electromagnetic-induction devices comprise a cordless pen and a tablet. There is an oscillating circuit that consists of LC in the cordless pen. If the penpoint is touched, the amount of inductance will be changed so that results in the variation of oscillating frequency. The amount of inductance is increased with the increasing pressure when touching the penpoint so the variation of oscillating frequency is also increased. Therefore, the variation of the pressure on the penpoint can be detected by way of the variation of oscillating frequency. There are two switches on the sidewall of the cordless pen, the emitted frequency of the cordless pen can be changed with the capacitance variation of the LC device that is produced by pushing down or setting the switches free. Furthermore, the tablet comprises a detector, an amplifier and an analogy-digital converter. In the conventional tablet, there is a detected loop in the center region of the tablet, and the one-way antennas are located on the double faces of the detected loop, wherein the one-way antennas are equidistantly arranged in order by way of using array. The main purpose of the one-way detected loop is only applied to receive the electromagnetic wave that is emitted by the cordless pen. When the cordless pen emits the electromagnetic wave, the one-way antennas receive the electromagnetic wave, and then the tablet can obtain correlative information by the electromagnetic induction. However, the conventional system with cordless pressure-sensitivity and electromagnetic-induction can only receive the electromagnetic waves from the peripheral apparatus thereof and detect the position of the peripheral apparatus.

On the other hand, recently, various image processing systems have been presented to the public, such as the digital camera and digital video camera. FIG. 1 shows a conventional motionless-image apparatus 100, such as digital photo-album. The motionless-image apparatus 100 comprises: a display unit 105, a back-lighted mode 110, an inverter circuit 115, a central processing unit (CPU) 120, a read only memory (ROM) 125, a dynamic memory 130, a serial interface 135, a storage medium 140, a power 145 and a plurality of keypads 150. The central processing unit 120 catches an image file from the storage medium 140 to decompress the image file, at the same time the image file format of the image file is transformed into a digital format that is necessary for the display unit 105, and then the image is shown on the display unit 105. Nevertheless, conventional motionless-image apparatus 100 can only display the motionless image, and it cannot generate handwriting and mix the handwriting and image by itself. Furthermore, conventional motionless-image apparatus 100 consumes most costs in the display unit 105, and its function is only used to show the motionless image. If user wants to add handwriting or their own autograph on the motionless image, the user has to process it with special efficacy via image software. Therefore, conventional motionless-image apparatus 100 consumes time and large costs. In accordance with the above description, a new motionless-image processing system with handwriting input function is therefore necessary, so as to strengthen and increase the functions of the motionless-image processing system.

SUMMARY OF THE INVENTION

In accordance with the present invention, a new motionless image processing system with handwriting input function is provided that substantially overcomes drawbacks of above mentioned problems in the conventional system in order to strengthens the functions of the motionless image processing system, so as to increase and improve efficiency of conventional image processing apparatus.

Accordingly, it is an object of the present invention to provide a new motionless-image processing system with handwriting input function. The present invention combines an image processing system with a system having cordless pressure-sensitivity and electromagnetic-induction, so as to take the image processing function to perfection.

Another object of the present invention is to provide a digital system for mixing handwriting with an image. This invention can mix handwriting with images by way of using a microprocessor with an image mixing function, so as to produce a new mixed-image file. This mixed-image is shown on a display unit by the image processing system of the present invention, whereby the present invention can reduce time and costs for mixing images. Therefore, this invention corresponds to economic effect and utilization in industry.

In accordance with the present invention, a new image processing system with handwriting input function is provided. In this invention, the image sensor receives light and transforms the light into analogy current signal according to color thereof, and the analogy current signal is transformed into a digital signal, and then the digital signal is transmitted into a digital image processing circuit to process images and generate a digital image signal. Afterwards, the digital image signal is controlled by a microprocessor of the image processing system, so as to transmit the digital image signal to a display means to show the image. If the user wants to add handwriting, the image processing system will start the apparatus with a cordless pressure-sensitivity and electromagnetic-induction, so as to catch coordinates and degree of width of handwriting by scanning antenna. Subsequently, the handwriting data is transmitted into the microprocessor of the image processing system, and then the microprocessor marks handwriting with a specific color and superimposes it on the image according to the coordinates and the degree of width of the handwriting, wherein the handwriting position is shown on the original site. Furthermore, in order for the position of apparatus to depict handwriting and the position and show that the handwriting are matched together on the same level of vertical altitude, it is necessary that the cordless pressure-sensitivity and electromagnetic-induction is centrally located under the display means. Wherein the displaying area of the display means are the same as the workable area of the apparatus with cordless pressure-sensitivity and electromagnetic-induction.

In the present invention, the controlling process as following: first of all, the microprocessor of the image processing system can perform a starting mode when the user switches on the power or presses the mode button. After the user selects and determines what mode is needed, the user can enter and start a specific function mode. In the specific function mode, various functions can be performed, such as function setting, function elimination or continuously broadcast function. Furthermore, in the apparatus with cordless pressure-sensitivity and electromagnetic-induction, the controlling process is as follows. The apparatus for depicting handwriting emits an electromagnetic wave with specific frequency. Then the antennas of the apparatus with cordless pressure-sensitivity and electromagnetic-induction scan the electromagnetic wave with a specific frequency and the circuit of the apparatus with cordless pressure-sensitivity and electromagnetic-induction amplifies it to calculate the frequency and amplitude of the vibration thereof. When the apparatus for depicting handwriting is centrally located on one of the antennas, this antenna receives the most intense signal. Therefore, the position of the apparatus for depicting handwriting can be detected by comparing the signal's intensity of each antenna. The position of the apparatus for depicting handwriting can also be converted into coordinates by comparing signal's intensity of antennas from each other. Afterward, degree of width of the handwriting is transmitted into the microprocessor of the image processing system. For easy accessing image, there are storage memory units in the image processing system. When the image sensor, such as digital camera, catches the image, the storage medium of the image sensor, such as compact flash card or smart media card, can be taken out. The storage medium is placed into the storage memory unit of the image processing system via serial interface of the storage medium. Thereafter, the microprocessor of the image processing system takes the data from the storage memory unit and decompresses it to restore the original image.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4A to FIG. 4E show the flowcharts of the microprocessor of the image processing system in accordance with the third embodiment of the present invention;

FIG. 5B shows block diagram of the electromagnetic-induction sub-circuit of the digital photo-album in accordance with the fourth embodiment of the present invention.

DESCRIPTION OF THE PREFERRED EMBODIMENT

Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
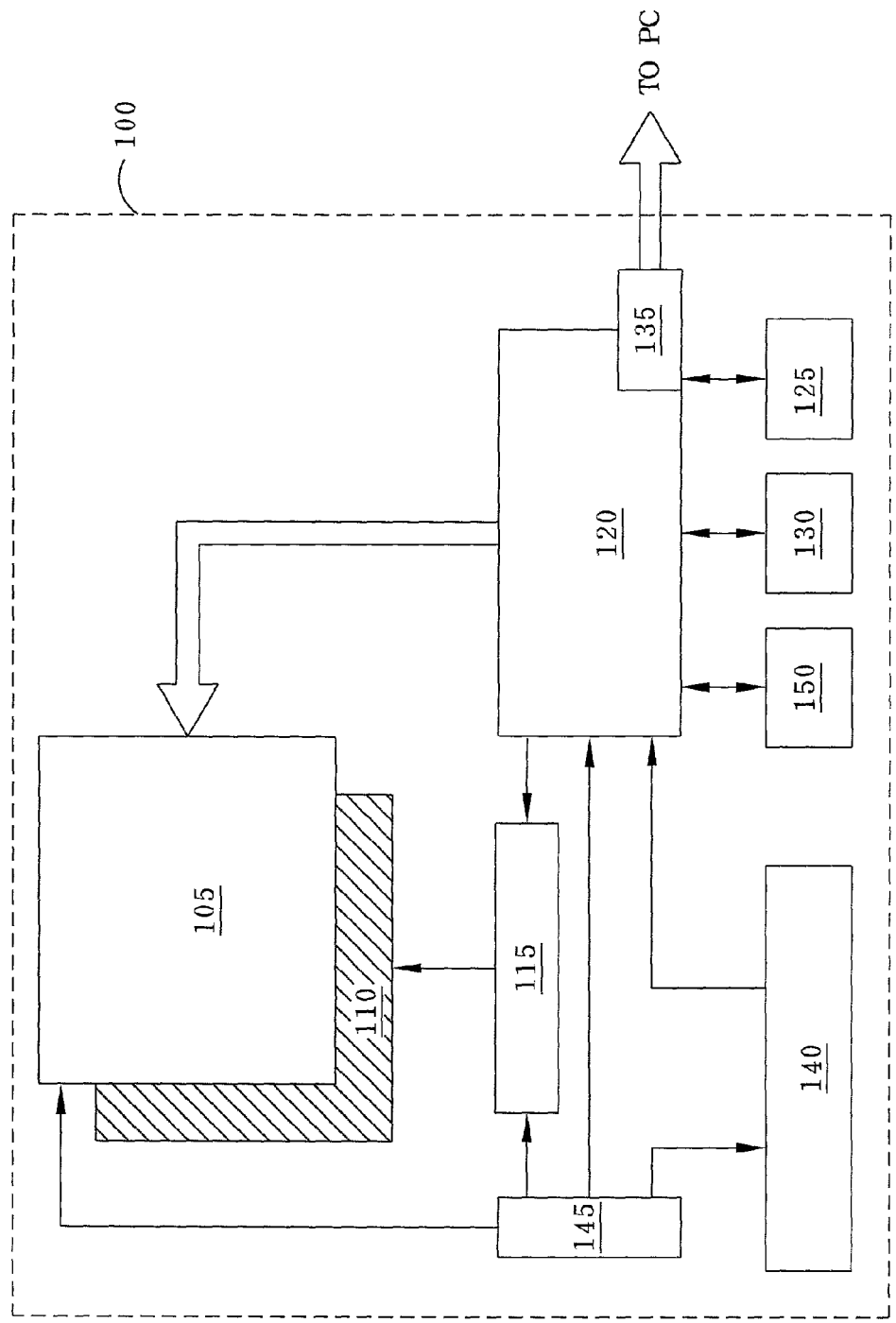
FIG. 1 shows cross-sectional views illustrative of block diagram of the conventional motionless-image apparatus.
Figure 2:
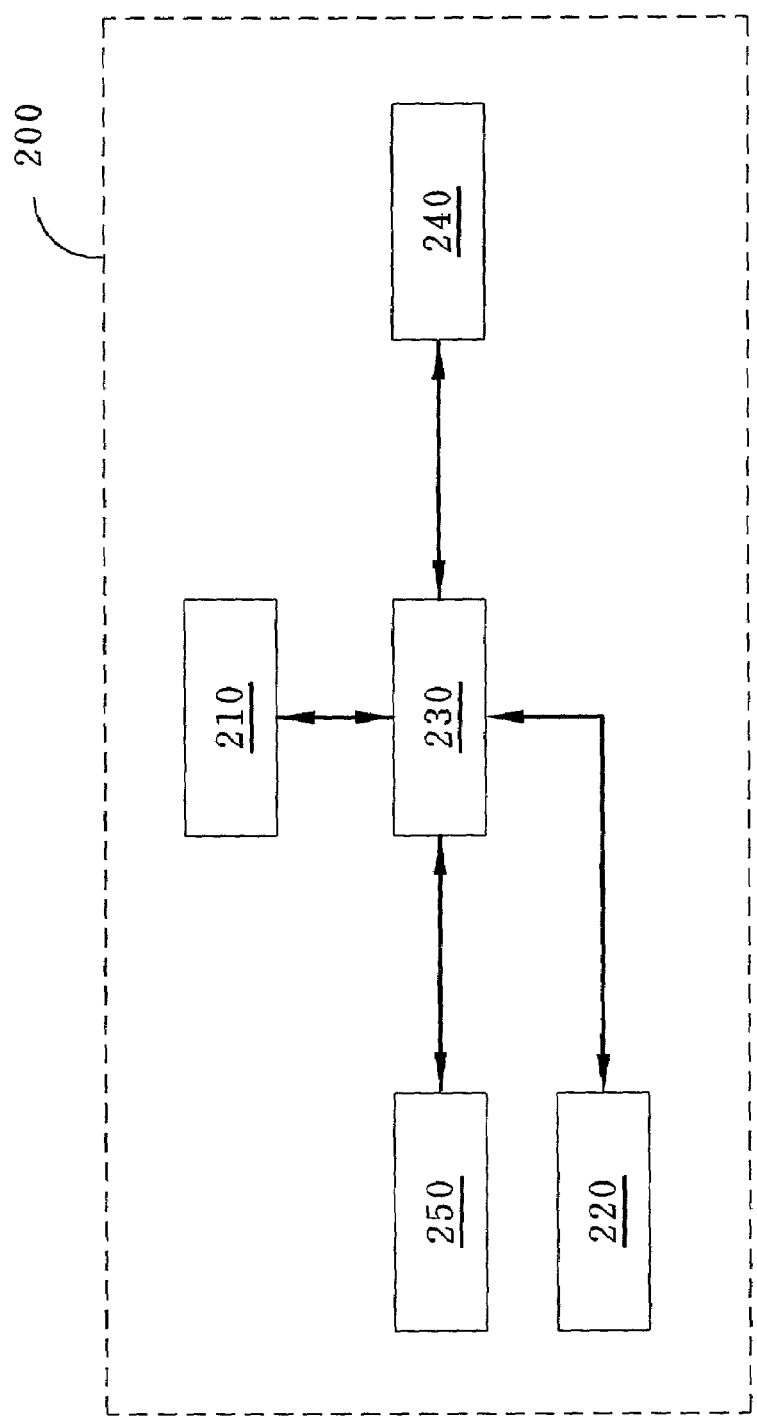
FIG. 2 shows block diagram of the image processing system in accordance with the first embodiment of the present invention.

As illustrated in FIG. 2, in the first embodiment of the present invention, first of all, an image processing system 200 is provided. The image processing system 200 comprises: an image-transmitting means 210, the image-transmitting means 210 can receive and process the first digital image signal to transmit it; an electromagnetic induction means 220, the electromagnetic induction means 220 can induce and process the electromagnetic wave with the specific frequency to generate the second digital image signal; an image processing means 230, the image processing means 230 can receive the first digital image signal and the second digital image signal to control and perform various image processing modes, such as mixing mode, deleting mode, broadcasting mode or setting mode, so as to generate the showing signal, wherein the image-processing means 230 can control to switch all means of the image processing system 200; a storage means 240, the image processing means 230 can access digital image data from the storage means 240; a display means 250, the display means 250 can receive image signal from the image processing means 230 to show the image.

Figure 3:
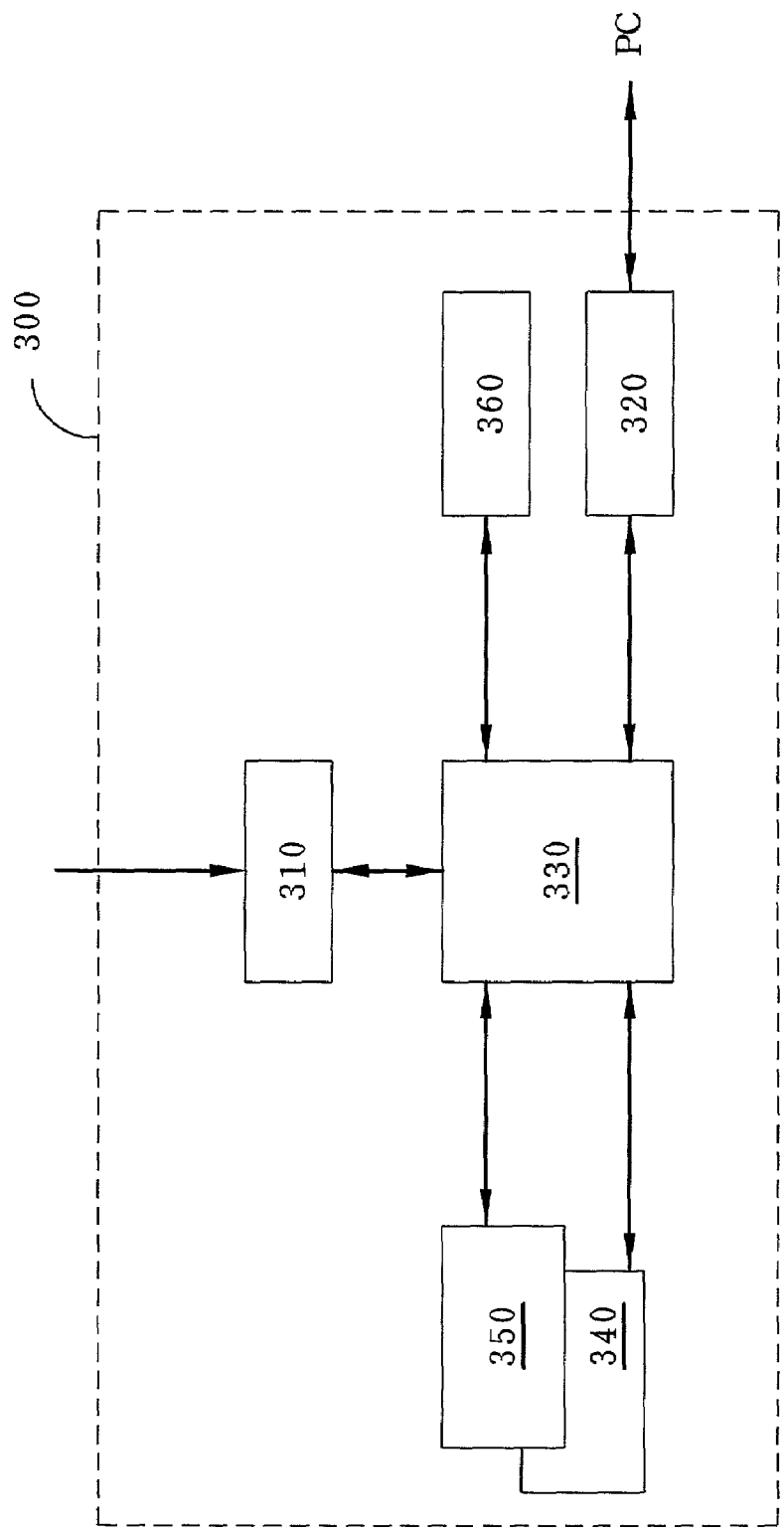
FIG. 3 shows block diagram of the motionless-image apparatus in accordance with the second embodiment of the present invention.

As illustrated in FIG. 3, in the second embodiment of the present invention, first of all, a motionless-image apparatus 300 with image mixing function, such as digital photo-album, is provided. The motionless-image apparatus 300 comprises an image sensing sub-circuit 310, the image sensing sub-circuit 310 can catch an image by way of an image-sensor and transform the image into an analogy signal. The analogy signal is transformed into a first digital signal, wherein the image sensing sub-circuit 310 comprises an image sensor, such as digital camera; an image transmitting sub-circuit 320 that is coupled with the external computer to communicate an image data. Wherein the image transmitting sub-circuit 320 comprises a serial interface, such as universal serial bus (USB), recommended standard-232 (RS-232); an image processing sub-circuit 330 that is coupled with the image sensing sub-circuit 310 to receive the first digital signal, and the image processing sub-circuit 330 is coupled with the transmitting sub-circuit 320 to transmit the image data, wherein the image processing sub-circuit 330 comprises a microprocessor to perform image processing functions and control to switch all sub-circuits of the motionless-image apparatus 300 with image-mixing function; an electromagnetic induction sub-circuit 340, such as tablet, that can receive an electromagnetic wave with specific frequency, and the electromagnetic induction sub-circuit 340 can also transform the electromagnetic wave with specific frequency into a second digital signal, wherein the electromagnetic induction sub-circuit 340 is coupled with the sub-circuit 330 for processing image to transmit the second digital signal, and the sub-circuit 330 for processing image perform an image mixing function according to the first digital signal and the second digital signal; a displaying sub-circuit 350 that is coupled with the sub-circuit 330 for processing image to receive signal for displaying various image, wherein the displaying sub-circuit comprises a liquid crystal display, such as thin-film transistor liquid crystal display (TFT-LCD), super twisted nematic liquid crystal display (STN-LCD); a storage sub-circuit 360 that is coupled with the sub-circuit 330 for processing image to access various image data, wherein the storage sub-circuit 360 comprises a communicating interface, such as compact flash card, smartmedia card, and a dynamic memory, such as DRAM, SDRAM.

Figure 4A:
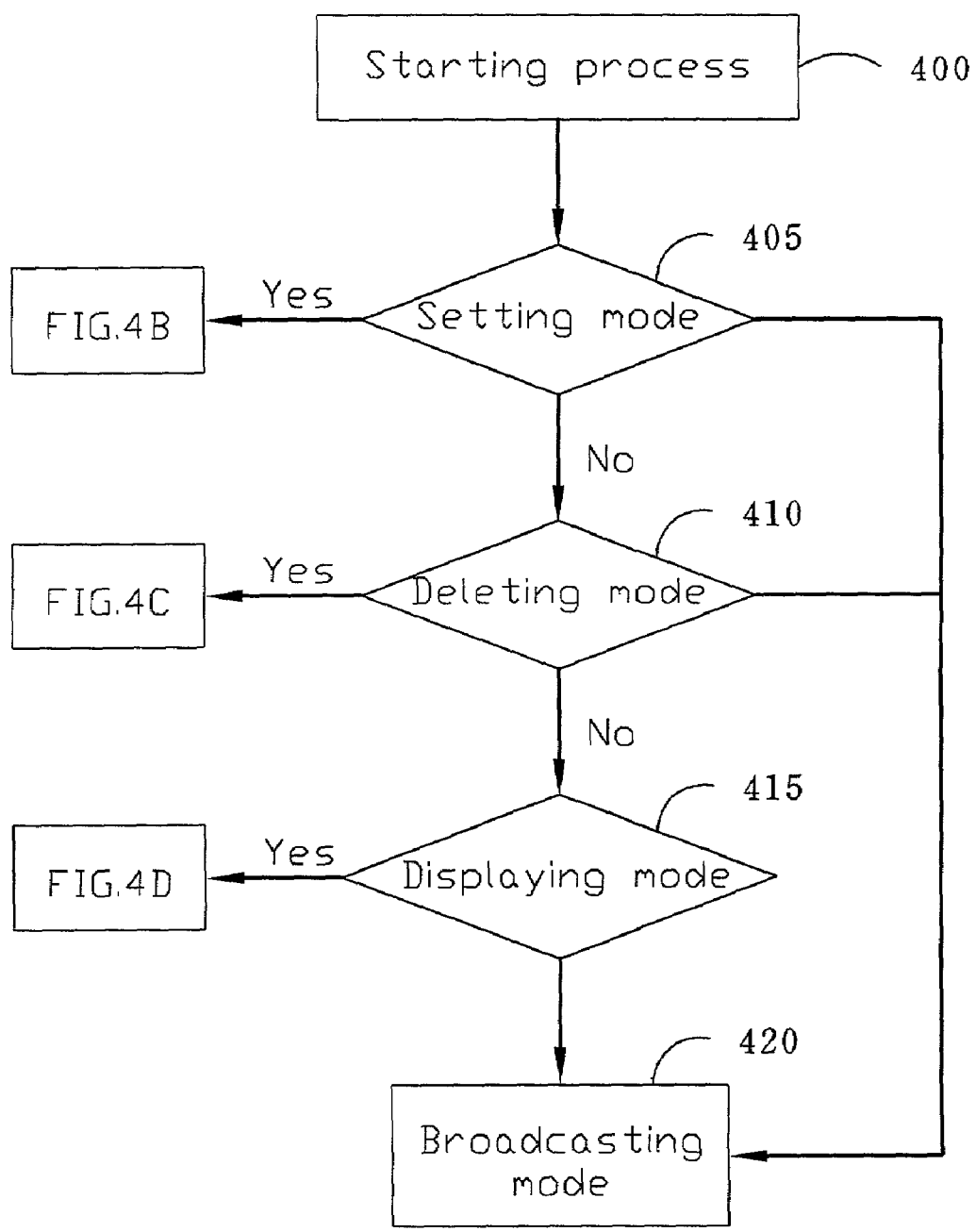

As illustrated in FIG. 4A, in the third embodiment of the present invention, the process of the microprocessor in the image processing system as following: a starting process 400 of the microprocessor comprises a plurality of specific function modes, and the plurality of specific function modes comprise: a setting mode 405, an deleting mode 410, a displaying mode 415 and a broadcasting mode 420. The microprocessor of the image-processing system can perform a starting process 400 when user switches on the power or presses the mode button. After the user selects and determines what mode is needed, the user can enter to execute the specific function modes. Furthermore, the broadcasting mode 420 can be performed after finishing the setting mode 405 or the deleting mode 410 or the displaying mode 415.

Referring to FIGS. 4A and 4B, in this embodiment, first of all, in the setting mode 405, the user can perform the following steps in order. Inputting step 425 to input an image showing format; then performing an adjusting step 430 to adjust the display's resolution; afterward, the user can enter to perform the broadcasting mode 420 or another specific function mode. Furthermore, if the user does not want to perform the setting mode 405, he can directly enter to perform another specific function modes.

Referring to FIGS. 4A and 4C, in this embodiment, when the user enters to perform the deleting mode 410, the user can perform the following steps in order. First of all, performing a confirmation step 435 to confirm if it is required to execute a step for deleting the image. If it is "Yes", the deleting step 440 is performed to delete the image. If it is "No", the user can directly enter to perform the broadcasting mode 420 or another specific function mode. After finishing the deleting step 440, the user can directly enter to perform the broadcasting mode 420 or another specific function mode. Moreover, if the user does not want to perform the deleting mode 410, he can directly enter to perform another specific function modes.

Figure 4D:
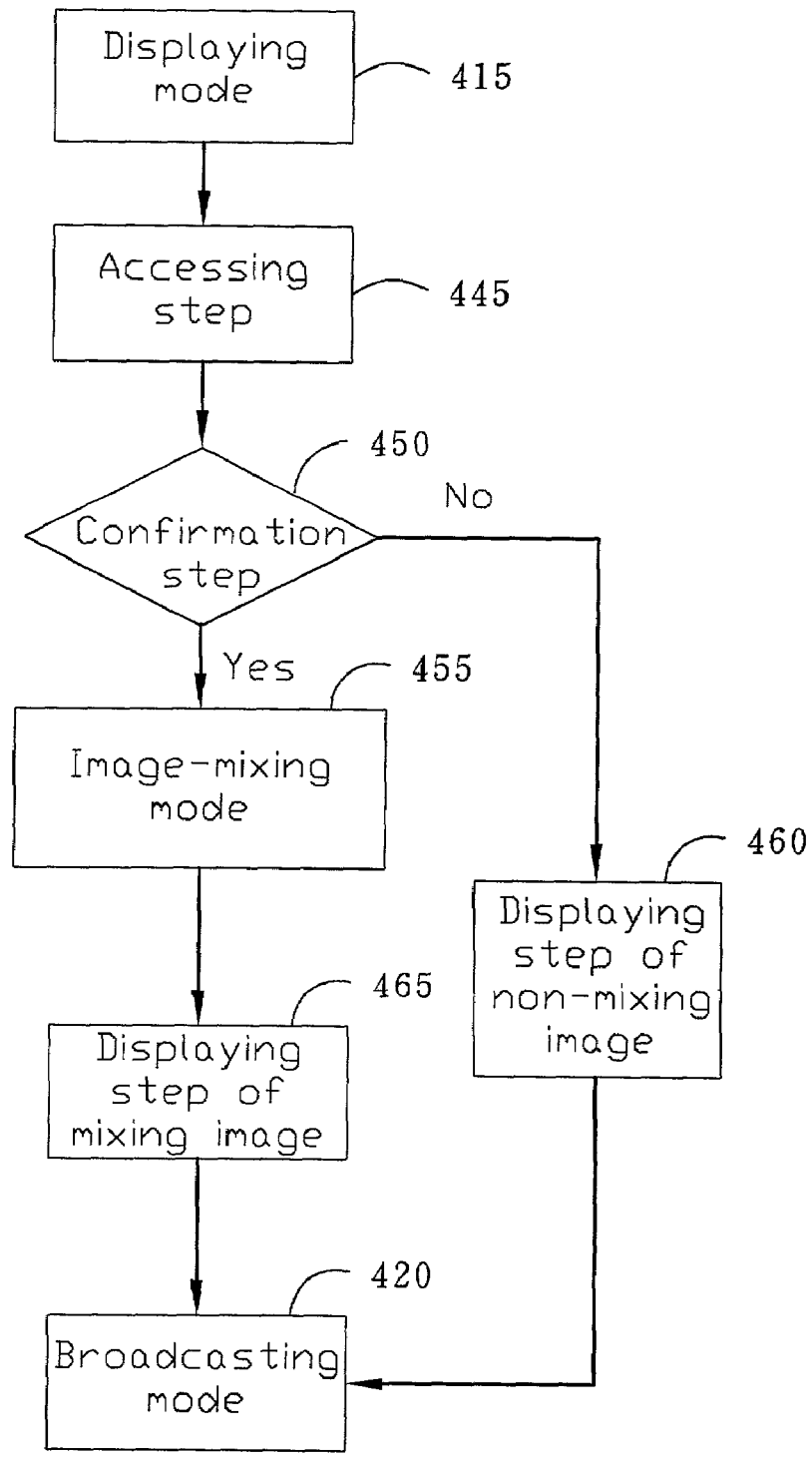

Referring to FIGS. 4A and 4D, in this embodiment, when the user enters to perform the displaying mode 415, the user can perform the following steps in order. First of all, performing an accessing step 445 to retrieve a specific serial number of the image that has been stored in the memory. Afterward, performing a confirmation step 450 to confirm if it is required to execute a step for mixing the image. If it is "Yes", an image-mixing mode 455 is performed to form a mixing image with the specific serial number. If it is "No", a displaying step 460 of non-mixing image is performed to show the stored image with the specific serial number, and then the user can directly enter to perform the broadcasting mode 420. After finishing image-mixing mode 455, a displaying step 465 of the mixing image is performed to show the mixing image with the specific serial number, and then the user can directly enter to perform the broadcasting mode 420.

Figure 4E:
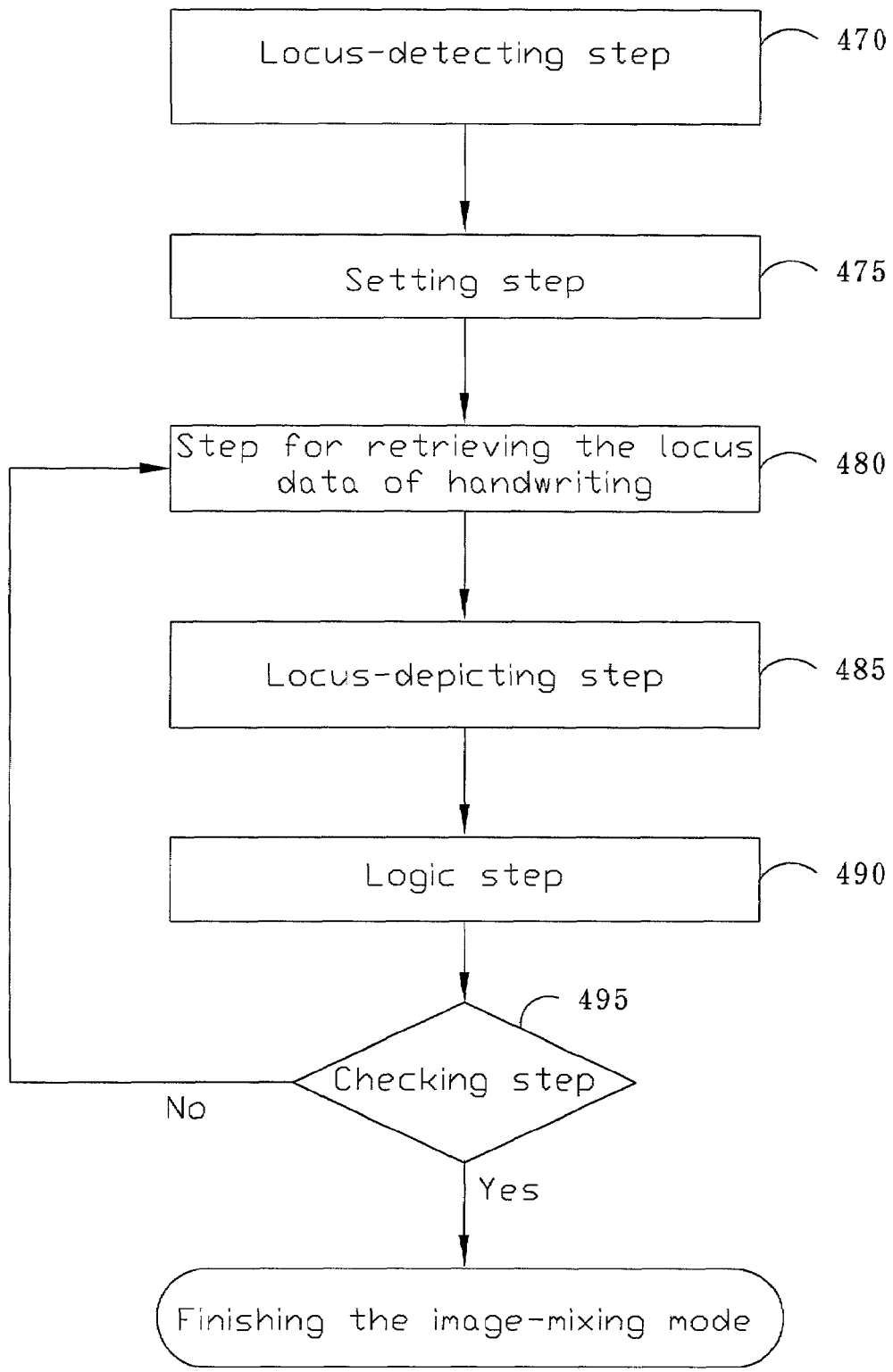

Referring to FIGS. 4D and 4E, in this embodiment, when performing the image-mixing mode 455, the microprocessor of the image processing system starts the apparatus with cordless pressure-sensitivity and electromagnetic-induction to catch the degree of width and coordinates of handwriting. The following steps of the image-mixing mode 455 are performed in the order as follows. First of all, performing a locus-detecting step 470 to catch a plurality of locus data of handwriting, and the a plurality of locus data of handwriting comprise a type of data as (Xi, Yi, W), wherein "Xi" indicates where the position is located on locus of X axis, "Yi" indicates where the position is located on locus of Y axis, and "W" indicates the size of the locus's diameter. Afterward, a setting step 475 of predetermined point is performed to set "i=n". A step 480 for retrieving the locus data of handwriting is then performed to retrieve the coordinates of locus and the size of locus's diameter. Subsequently, a locus-depicting step 485 is performed to draw the handwriting, wherein the locus-depicting step 485 can draw a plurality of drops with specific color by way of using a plurality of locus data (Xi, Yi) as a plurality of circle centers and W/2 as radius thereof. Then a logic step 490 is performed by way of using a program of "i=i−1". Afterward, a checking step 495 is performed to check whether "i" is equal to "0" or not. If "i=0", the function for depicting loci of the image is finished, and then the handwriting and storage image with the specific serial number is mixed to form a mixing image with the specific serial number. If "i≠0", the process returns to rework the step 480 for retrieving the locus data of handwriting to continuously perform the function for depicting loci of the image until "i=0".

Figure 5A:
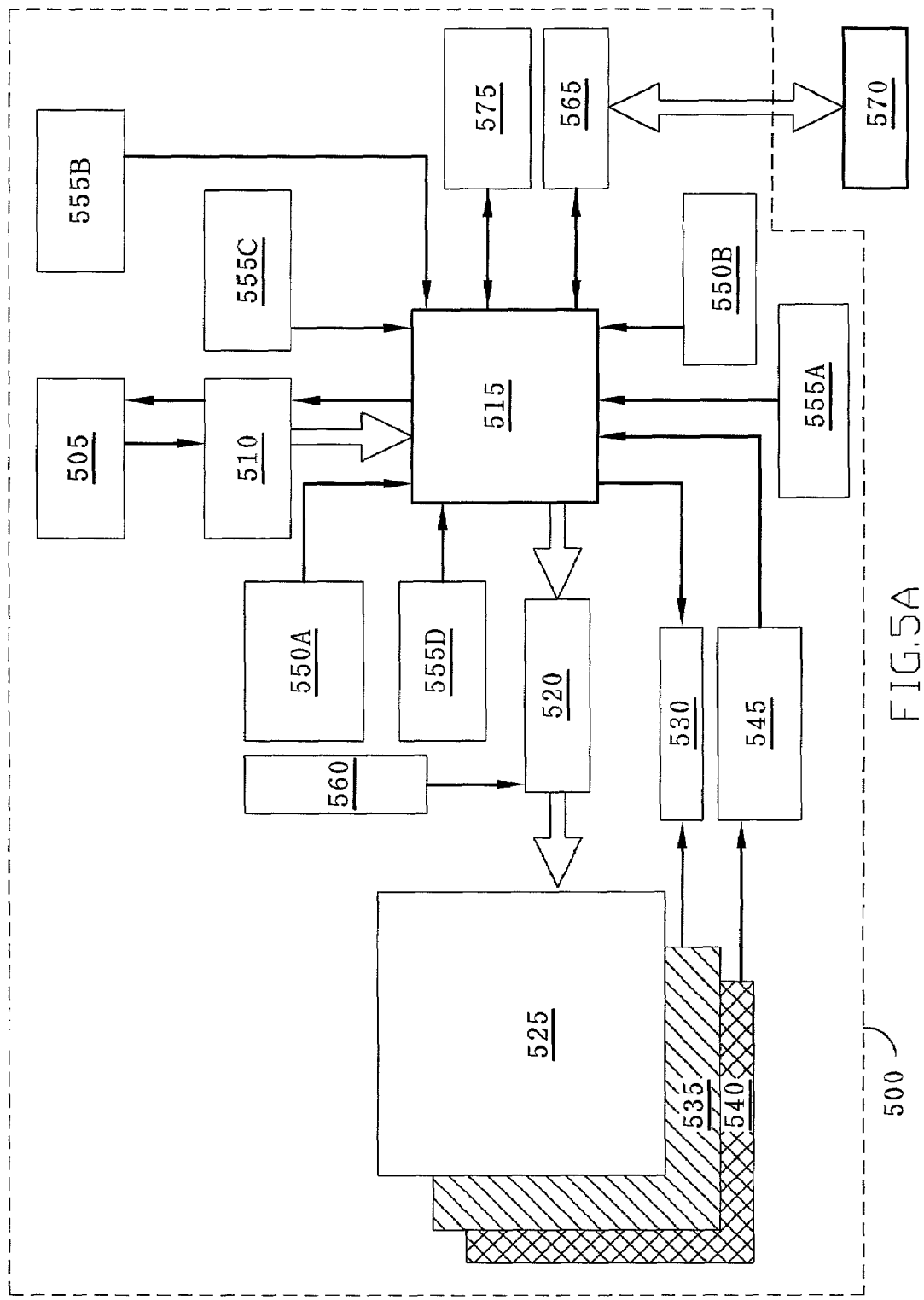
FIG. 5A shows block diagram of the digital photo-album with handwriting inputting function in accordance with the fourth embodiment of the present invention.

As illustrated in FIG. 5A, in the fourth embodiment of the present invention, first of all, a digital photo-album 500 with handwriting-inputting function is provided. The digital photo-album 500 comprises an image-sensor 505 that can catch an image by transduction of optical radiation of the image data; an sub-circuit 510 for transforming an image signal that is coupled with the image-sensor 505 to transform the image into an analogy signal. Then the analogy signal is transformed into a first digital signal; a microprocessor 515 that is coupled with the sub-circuit 510 for transforming image signal to receive the first digital signal. This is to perform the image processing function and to control and switch all sub-circuits and devices of the digital photo-album 500. A display driving sub-circuit 520 that is coupled with the microprocessor 515 to receive a display signal; a display device 525 that is coupled with the display driving sub-circuit 520 to show various images. Wherein the display device 525 comprises a TFT-LCD or an STN-LCD; an inverter sub-circuit 530 that is coupled with the microprocessor 515 to receive an adjusting signal. This is done to generate a specific voltage; a back-lighted module 535 that is coupled with the inverter sub-circuit 530 to receive the specific voltage. Wherein the back-lighted module 535 is located under the display device 525; an antenna loop 540 that can receive a signal of electromagnetic wave by electromagnetic induction; a electromagnetic-inducting sub-circuit 545 that is coupled with the antenna loop 540 to receive the signal of electromagnetic wave. This is to transform the signal of electromagnetic waves into a second digital signal, and the electromagnetic-inducting sub-circuit 545 couples to transmit the second digital signal into the microprocessor 515. Wherein the microprocessor 515 can perform an image mixing function according to the first digital signal and the second digital signal, and further, the workable area of the electromagnetic-inducting sub-circuit 545 that is located under the back-lighted module 535 is about the same as display area.

Referring to FIG. 5A, in this embodiment, the digital photo-album 500 comprises a plurality of mode buttons that are coupled with the microprocessor 515 to select specific modes for specific functions. Wherein the plurality of mode buttons further comprise a broadcast mode button 550A and a deleting mode button 550B and a plurality of switches that are coupled with the microprocessor 515 to start specific functions. Wherein the plurality of switches further comprise a first switch 555A, a second switch 555B, a third switch 555C and a fourth switch 555D, and further, the first switch 555A can control to switch the antenna loop 540 and the electromagnetic-inducting sub-circuit 545, the second switch 555B can control the variation of the image, such as both sides of the image can be changed from each other, the third switch 555C can control to change page of the image, and the fourth switch 555D can control to switch the image-sensor 505; a display adjusting button 560 that is coupled with the display driving sub-circuit 520 to adjust the pictures shown on the display device 525; a transmitting interface 565 that is coupled with the external computer 570 to communicate an image data, wherein the transmitting interface 565 comprises an universal serial bus (USB) or a recommended standard-232 (RS-232); a stored device 575 that is coupled with the microprocessor 515 via an accessing interface, so that the microprocessor 515 accesses various images, wherein the stored device 575 comprises DRAM or SDRAM, and the accessing interface comprises a compact flash card or a smartmedia card.

Referring to FIG. 5A and FIG. 5B, in this embodiment, the electromagnetic-inducting sub-circuit 545 comprises: an amplifier 545A that is coupled with the antenna loop 540 to magnify the signal of the electromagnetic wave; a band pass filter 545B that is coupled with the amplifier 545A to filter the signal of the electromagnetic wave and generate a signal with specific frequency; a shaping sub-circuit 545C that is coupled with the band pass filter 545B to receive the signal with specific frequency and generate a clock signal; a rectifier 545D that is coupled with the band pass filter 545B to receive the signal with specific frequency and generate a direct signal; a peak detector 545E that is coupled with the rectifier 545D to detect the peak of the direct signal; an Analogy/Digital converter 545F that is coupled with the peak detector 545E to receive the peak and transform the peak into a digital signal; a micro-processor 545G of the electromagnetic-inducting sub-circuit 545 that is coupled with the Analogy/Digital converter 545F to receive the digital signal and calculate an absolute coordinate, and further, the micro-processor 545G of the electromagnetic-inducting sub-circuit 545 that is coupled with the shaping sub-circuit 545C to receive the clock signal and calculate a pressure value, wherein the pressure value indicates degree of width of image line, and further, the micro-processor 545G is coupled with the micro-processor 515 of the digital photo-album 500 to transmit the absolute coordinate and the pressure value, and micro-processor 545G couples to control the antenna loop 540 to scan position. Moreover, the digital photo-album 500 further comprise a peripheral apparatus 580 with electromagnetic induction, such as cordless pen, the peripheral apparatus 580 can input image above the display device 525 and the antenna loop 540 can receive the electromagnetic wave that is emitted from the peripheral apparatus 580.

Figure 5C:
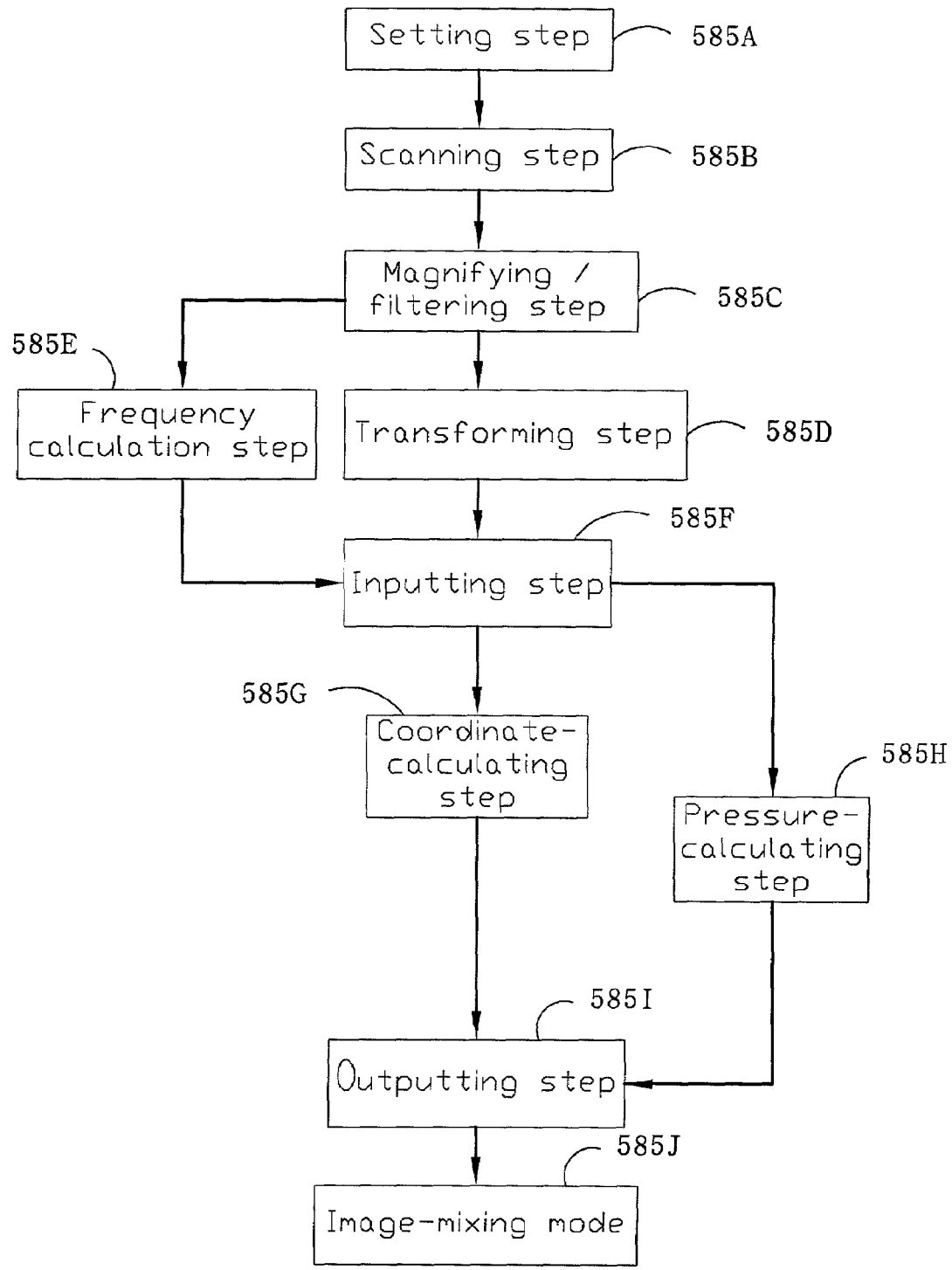
FIG. 5C shows the flowcharts of the microprocessor of the electromagnetic-induction sub-circuit in accordance with the fourth embodiment of the present invention.

Referring to FIG. 5B and FIG. 5C, in this embodiment, the electromagnetic-inducting sub-circuit 545 of the digital photo-album 500 is processed as follows. First of all, a setting step 585A is performed to process the original set of the electromagnetic-inducting sub-circuit 545 and switch on the antenna loop 540. Then the antenna loop 540 starts to perform a scanning step 585B, so as to scan the position of the peripheral apparatus 580 and receive the electromagnetic wave signal that is emitted from the peripheral apparatus 580. When the electromagnetic-inducting sub-circuit 545 receives the electromagnetic wave signal, a magnifying/filtering step 585C is performed by way of the amplifier 545A and the band pass filter 545B to generate the signal with specific frequency. Afterward, a transforming step 585D is performed by way of the rectifier 545D, the peak detector 545E and the Analog/Digital converter 545F to receive the signal with specific frequency and generate the digital signal. Next, a frequency-calculating step 585E is performed by way of shaping the sub-circuit 545C to receive the signal with a specific frequency and generate a clock signal. The microprocessor 545G receives the digital signal and a clock signal according to an inputting step 585F. The microprocessor 545G then performs a coordinate-calculating step 585G to calculate the absolute coordinate of the image that is drawn on the display device 525, at the same time the microprocessor 545G performs a pressure-calculating step 585H to calculate the pressure value of the image that is drawn on the display device 525 by way of using the peripheral apparatus 580. In the other words, when the distance between the peripheral apparatus 580 and the display device 525 becomes shorter, the electromagnetic wave signal also becomes intense, so that the lines of the image become wider. Subsequently, an outputting step 585I is performed to output the pressure values and the absolute coordinates from the microprocessor 545G of the electromagnetic-inducting sub-circuit 545 into the microprocessor 515 of the digital photo-album 500. Finally, the microprocessor 515 of the digital photo-album 500 performs an image-mixing mode 585J.

In these embodiments of the present invention, the present invention combines an image processing system with a system having cordless pressure-sensitivity and electromagnetic-induction to make an image processing system with handwriting input function. Furthermore, the present invention also provides a digital image processing system with various critical technologies that include image sensor, tablet and digital photo-album. Therefore, this invention is a digital image processing apparatus with convenience and multi-function, such as camera function, handwriting function and photo-album function. Moreover, this invention can mix handwriting with image by way of using a microprocessor with image mixing function and a microprocessor with handwriting inputting function, so as to form a new mixed-image file, and this mixed-image is shown on display unit by the image processing system of the present invention, whereby the present invention can reduce time and costs for mixing image. Accordingly, this invention corresponds to economic effect and utilization in industry.

Of course, it is possible to apply the present invention for the digital photo-album, and to any digital image processing system with cordless pressure-sensitivity and electromagnetic-induction. Also, the present invention that combines the digital image processing apparatus with the cordless pressure-sensitivity and electromagnetic-induction apparatus has not been developed at present.

Although specific embodiments have been illustrated and described, it will be obvious to those skilled in the art that various modifications may be made without departing from what is intended to be limited solely by the appended claims.

Obviously, many modifications and variations of the present invention are possible in light of the above teachings. It is therefore to be understand that within the scope of the appended claims, the present invention may be practiced otherwise than as specifically described herein.

What is claimed is:

1. A motionless-image processing system comprising:
   an image sensing sub-circuit, said image sensing sub-circuit can catch image by transduction of optical radiation of the image data to generate a first image signal;
   an image transmitting sub-circuit that is coupled with the external computer to communicate said image data;
   an electromagnetic induction sub-circuit having a first processor and a second processor, said electromagnetic induction sub-circuit for receiving the electromagnetic wave signal and generating a second image signal;
   an image processing sub-circuit that is coupled with said image sensing sub-circuit to receive said first image signal, and said image processing sub-circuit is coupled with said transmitting sub-circuit to communicate said image data, and said image processing sub-circuit is coupled with said electromagnetic induction sub-circuit to receive said second image signal, wherein said image processing sub-circuit can control to switch all sub-circuits of said motionless-image processing system, and said second processor of said image processing sub-circuit can perform an image mixing function to form a mixed image with specific serial number according to said first image signal and said second image signal to generate an image showing signal according to said first image signal and said second image signal;
   a displaying sub-circuit that is coupled with said image processing sub-circuit to receive said image showing signal and show image; and
   a storage sub-circuit that is coupled with said image processing sub-circuit to access various image data.

2. The motionless-image processing system according to claim 1, wherein said image sensing sub-circuit comprises an image sensor.

3. The motionless-image processing system according to claim 2, wherein said image sensor comprises a digital camera.

4. The motionless-image processing system according to claim 1, wherein said image transmitting sub-circuit comprises a serial interface.

5. The motionless-image processing system according to claim 4, wherein said serial interface comprises an universal serial bus.

6. The motionless-image processing system according to claim 4, wherein said serial interface comprises a recommended standard-232.

7. The motionless-image processing system according to claim 1, wherein said electromagnetic induction sub-circuit comprises a tablet.

8. The motionless-image processing system according to claim 1, wherein said first processor comprises a locus-detecting step to generate a plurality of locus data according to the electromagnetic wave signal.

9. The motionless-image processing system according to claim 8, wherein said plurality of locus data comprise a type of data as ($X_i$, $Y_i$, $W$), wherein "$X_i$" and "$Y_i$" indicates the position of coordinates, and "$W$" indicates the size of locus's diameter.

10. The motionless-image processing system according to claim 1, wherein said first processor comprises a locus-depicting step to draw a plurality of drops with specific color.

11. The motionless-image processing system according to claim 10, wherein said plurality of drops can be drew by way of using a plurality of locus data ($X_i$, $Y_i$) as a plurality of circle centers and $W/2$ as radius thereof.

12. The motionless-image processing system according to claim 1, wherein said displaying sub-circuit comprises a liquid crystal display.

13. A digital photo-album with handwriting inputting function, said digital photo-album comprising:
   an image-sensor tat can catch an image by transduction of optical radiation of the image data;
   an image signal sub-circuit that is coupled with said image-sensor to receive said image and generate a first image signal;
   a first microprocessor that is coupled with said image signal sub-circuit to receive said first image signal;
   said first microprocessor is coupled with a plurality of mode buttons to select specific modes, a plurality of switches to start specific functions, and a transmitting interface to communicate the external computer;
   a display driving sub-circuit that is coupled with said first microprocessor to receive a displaying signal;
   a liquid crystal display that is coupled with said display driving sub-circuit to show various images;
   an inverter sub-circuit that is coupled with said microprocessor to receive an adjusting signal, so as to generate a specific voltage;
   a back-lighted module that is coupled with said inverter sub-circuit to receive said specific voltage;
   an antenna loop that can receive an electromagnetic wave signal by electromagnetic induction; and
   an electromagnetic-inducting sub-circuit with a second microprocessor that is coupled with said antenna loop to receive said electromagnetic wave signal, so as to generate a second image signal, wherein said electromagnetic-inducting sub-circuit is coupled with said first microprocessor to transmit said second digital signal, and said first microprocessor can form a mixed-image according to said first image signal and said second image signal; and
   a peripheral apparatus that can emit electromagnetic wave signal by way of electromagnetic induction, said peripheral apparatus can input image above said liquid crystal display.

14. The digital photo-album according to claim 13, wherein said plurality of mode buttons comprise a broadcast mode button.

15. The digital photo-album according to claim 13, wherein said plurality of mode buttons comprise a deleting mode button.

16. The digital photo-album according to claim 13, wherein said plurality of switches comprise a first switch to control to switch said antenna loop and said electromagnetic-inducting sub-circuit.

17. The digital photo-album according to claim 13, wherein said plurality of switches comprise a second switch to control image variation.

18. The digital photo-album according to claim 13, wherein said plurality of switches comprise a third switch to control to change page of the image.

19. The digital photo-album according to claim 13, wherein said plurality of switches comprise a fourth switch to control to switch said image-sensor.

20. The digital photo-album according to claim 13, wherein said transmitting interface comprises an universal serial bus.

21. The digital photo-album according to claim 13, wherein said transmitting interface comprises a recommended standard-232.

22. The digital photo-album according to claim 13, wherein said first microprocessor is coupled with a stored device.

23. The digital photo-album according to claim 22, wherein said stored device is coupled with said microprocessor via an accessing interface, so that said microprocessor accesses various image data.

24. The digital photo-album according to claim 13, wherein said display driving sub-circuit is coupled with a adjusting button to adjust the pictures shown on said liquid crystal display.

25. The digital photo-album according to claim 13, wherein said back-lighted module is located under said liquid crystal display.

26. The digital photo-album according to claim 13, wherein said antenna loop is located under said back-lighted module.

27. The digital photo-album according to claim 13, wherein said electromagnetic-inducting sub-circuit comprises:
   an amplifier that is coupled with said antenna loop;
   a band pass filter that is coupled with said amplifier to generate a signal with a specific frequency;
   a shaping sub-circuit that is coupled with said band pass filter to receive said signal with said specific frequency and generate a clock signal, wherein said second microprocessor is coupled with said shaping sub-circuit to receive said clock signal and calculate a pressure value;
   a rectifier that is coupled with said band pass filter to receive said signal with said specific frequency and generate a direct signal;
   a peak detector that is coupled with said rectifier to detect the peak of said direct signal; and
   an Analogy/Digital converter that is coupled with said peak detector to receive the peak and transform the peak into a digital signal, wherein said second microprocessor is coupled with said Analogy/Digital converter to receive said digital signal and calculate an absolute coordinate.

28. The digital photo-album according to claim 27, wherein said second image signal is generated according to said pressure value and said absolute coordinate by said second microprocessor.

29. The digital photo-album according to claim 13, wherein said second microprocessor is coupled with said first microprocessor to transmit said second image signal.

30. The digital photo-album according to claim 13, wherein said second microprocessor is coupled with said antenna loop to control to scan position.

31. The digital photo-album according to claim 13, wherein said peripheral apparatus comprises a cordless pen.

* * * * *